Sept. 23, 1930.  I. AMUNDSEN  1,776,745
REFRIGERATING PLANT
Original Filed Oct. 29, 1926
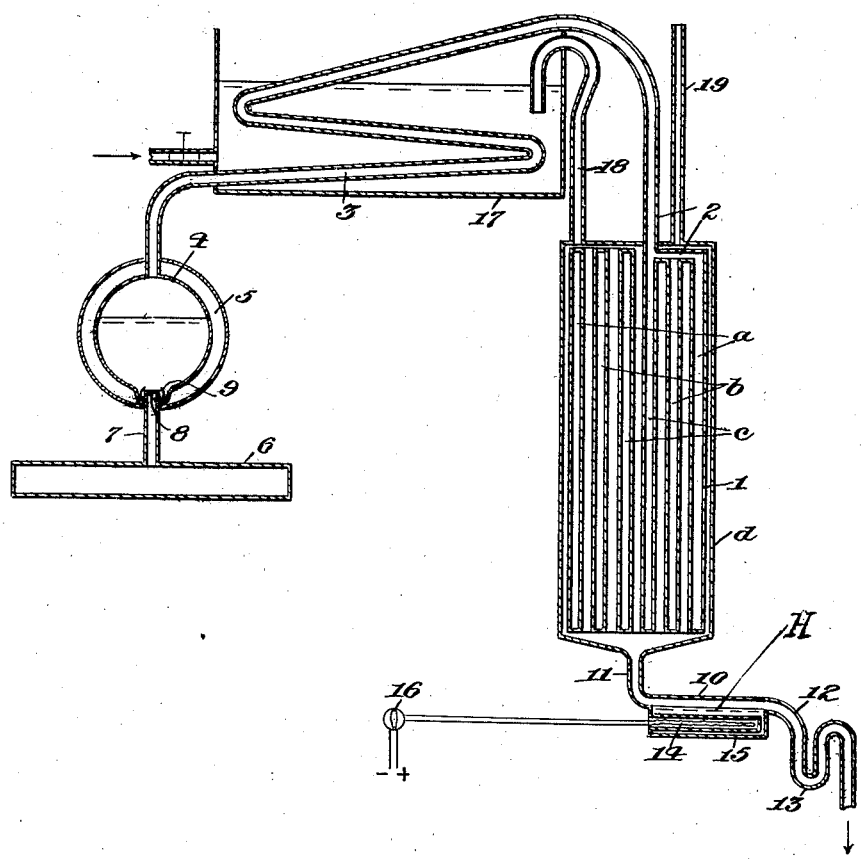
Inventor:
I. Amundsen, Patented Sept. 23, 1930

1,776,745

UNITED STATES PATENT OFFICE

IVAR AMUNDSEN, OF OSLO, NORWAY

REFRIGERATING PLANT

Original application filed October 29, 1926, Serial No. 145,037, and in Norway January 28, 1926. Divided and this application filed September 29, 1927. Serial No. 222,850.

The present invention relates to refrigerating plants of the adsorption or absorption type and has for its object an improvement in the heating system for the adsorption or absorption vessel.

According to the present invention which is a division of my pending application #145,037, filed October 29, 1926, which has matured into Patent No. 1,647,208, the heating of the adsorption or absorption vessel takes place by means of steam developed in a boiler situated below the vessel.

Hereby it is obtained that various temperatures in the adsorption or absorption vessel are avoided and at the same time the transmission of heat is very efficient owing to the great heat transmission coefficient of condensing steam.

Further in accordance with the invention the steam condensed on the walls of the adsorbing vessel is returned automatically by its own gravity to the boiler where it is again evaporated. The amount of water used for this purpose may accordingly be very small.

As the adsorbing vessel is heated by means of a source of heat located outside the vessel one is always sure of under no circumstances heating the adsorption vessel to a temperature above 100° C.

An embodiment of the invention is illustrated on the drawing which shows a diagrammatical section of the refrigerating plant. 1 is the vessel containing for instance a gas-adsorbing medium, said vessel comprising a number of coaxial double-walled cylinders $a$, $b$, $c$, which are filled with the said medium and which are all connected by means of tube 2 to the condenser 3. In the space between the cylinders and between the exterior shell $d$ and cylinder $a$ fluid for cooling or heating the adsorption medium is supplied.

The boiler or receiver 10 which communicates by means of tube 11 with the chamber surrounding the exterior surface of the vessel 1 is provided with an outlet 12 having a liquid seal 13. The boiler 10 may be heated in any well known manner for instance as indicated by means of an electric heating element 14 mounted in the tube 15 inside the boiler and controlled by means of switch 16.

The cooling of the adsorption vessel may take place in accordance with applicant's Patent No. 1,632,387 granted June 14, 1927, by means of cooling liquid supply from a condenser vessel 17 through siphon 18 and the exterior shell $d$ enclosing the adsorption vessel, may be in direct communication with the atmosphere as indicated by means of tube 19.

After the termination of the cooling period for vessel 1 the water level will be as indicated by line H. During the subsequent heating period the steam developed escapes into shell $d$ and is condensed on the walls of adsorption cylinders $a$, $b$, $c$, the condensed water flowing back to boiler 10. The water lock 13 prevents the escape of steam through tube 12.

In the following claim, it is to be understood that the term absorption is used in its generic sense, including also the phenomenon of adsorption.

Claim:

A refrigerating plant of the absorption type comprising a vessel adapted to contain a medium for alternately absorbing and liberating a refrigerating fluid, a shell forming a jacket surrounding said vessel, having a cooling water inlet adjacent the top of said shell and an outlet conduit adjacent the bottom, whereby unidirectional flow of cooling fluid is effected, means for supplying cooling water intermittently to said shell, a receiver arranged below said outlet conduit, and communicating therewith at an intimate point, for retaining a portion of the cooling fluid, and means for heating the retained contents of said receiver at periods alternating with those during which cooling fluid is supplied to said shell, to provide steam within said shell for heating said vessel.

In testimony whereof I have signed my name to this specification.

IVAR AMUNDSEN.